April 6, 1965    H. S. J. PIJLS ETAL    3,177,416
DRIVING OSCILLATOR FOR PRODUCING SUPERSONIC OSCILLATIONS
Filed Sept. 7, 1961    2 Sheets-Sheet 1

INVENTOR
HERMANUS S.J. PIJLS
LOURENS BLOK.
BY
AGENT

INVENTOR
HERMANUS S.J. PIJLS
LOURENS BLOK

BY

AGENT

United States Patent Office 3,177,416
Patented Apr. 6, 1965

3,177,416
DRIVING OSCILLATOR FOR PRODUCING
SUPERSONIC OSCILLATIONS
Hermanus Stephanus Josephus Pijls and Lourens Blok, both of Emmasingel, Eindhoven, Netherlands, assignors to North American Philips Company, Inc., New York, N.Y., a corporation of Delaware
Filed Sept. 7, 1961, Ser. No. 136,600
Claims priority, application Netherlands, Oct. 4, 1960, 256,519
14 Claims. (Cl. 318—118)

This invention relates to a device for producing supersonic oscillations and more particularly to a device comprising a feedback oscillator which produces a current of supersonic frequency which is applied to a load circuit including a piezo-magnetic transducer, from which an electric voltage is derived which is applied as a feedback voltage through a feedback circuit connected to the load circuit of the oscillator. This device is especially suitable for generating high supersonic powers, for example, several tens of watts to several kilowatts. In practice such devices are effectively used for purifying purposes, emulsifying, dispersing, degasifying and the like.

An object of the invention is to provide a device of the kind set forth which is distinguished not only by a maximum efficiency in the conversion of electrical energy into mechanical oscillatory energy, but also by high reliability and simplicity of control.

The device according to the invention is characterized in that the oscillator current supplied by the feed-back oscillator to the piezo-magnetic, i.e. magnetostrictive, transducer is supplied, in addition, to a coil connected in series with the piezo-magnetic transducer, while a frequency-dependent current division is practically avoided. This latter coil is magnetically coupled with a series-connected coil included in the feedback circuit to produce a second feedback voltage which substantially compensates for the inductive component of the feedback voltage normally produced by inductances in the load circuit. The device is further characterized in that the load circuit includes a capacitor connected in series with the piezo-magnetic transducer and the series coil. The series capacitor is tuned with the inductances in the load circuit substantially to the natural frequency of the piezo-magnetic transducer.

The invention and its advantages will now be described more fully with reference to the accompanying drawing wherein.

Figure 1:
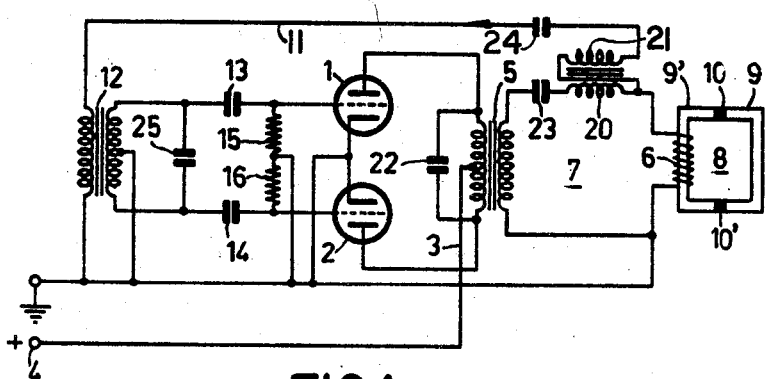
FIG. 1 shows one embodiment of a device according to the invention.

In the device shown in FIG. 1, the supersonic energy of a frequency of 21 kc./s. is derived from an electronic push-pull connected oscillator comprising triodes 1, 2 of which the anodes are connected via the conductor 3 to the positive terminal 4 of a voltage supply source. The device shown may be designed for a power of 200 watts.

The oscillator current produced by the electron tube oscillator 1, 2 is applied via a matching transformer 5 to the energizing coil 6 of a piezo-magnetic transducer 8, sometimes referred to as a magnetostrictive transducer included in the load circuit 7 of the oscillator 1, 2. The transducer thus oscillates and yields its mechanical oscillatory energy to the load, for example, a fluid bath, not shown.

The piezo-magnetic transducer 8 is composed of two U-shaped bodies 9, 9' of piezo-magnetic material having a small loss angle, for example, ferroxcube, which is composed mainly of non-conductive ferrites. Transducer 8 further comprises intermediate premagnetisation plates 10, 10' of permanent magnetic material, for example, magnadur, consisting of non-cubic crystals of iron polyoxides and at least one of the metals barium, strontium, lead and, as the case may be, calcium. The use of ferroxcube as a piezo-magnetic material has the important advantage that the conversion factor in the piezo-magnetic transducer 8 of the electrical energy into mechanical oscillatory energy has a very high value. Instead of using the permanent magnetic plates 10, 10', the premagnetisation may be obtained in a different way, for example, by providing the piezo-magnetic transducer 8 with a premagnetisation winding connected to a suitable bias voltage source.

In order to obtain the feedback voltage required for the control of the tubes 1, 2, connected as an oscillator, the feedback circuit 11 is directly connected electrically to the load circuit 7, from which the feedback voltage is supplied via a feedback transformer 12 and grid capacitors 13, 14 to the control-grids of the triodes 1, 2. The control grids are in turn connected via the grid resistors 15, 16 to the earth-connected cathodes of triodes 1, 2. In the device described the piezo-magnetic transducer constitutes the frequency-determining element of the oscillator 1, 2, so that the latter will generate an oscillation voltage having a frequency which is determined solely by the piezo-magnetic transducer.

It has been found in practice that, when using the device described, the efficiency of the conversion of electrical energy into mechanical oscillatory energy produced by the piezo-magnetic transducer 8 decreases to a great extent in the case of a heavy load of the piezo-magnetic transducer 8. It has been found that this is due to the particular nature of the impedance formed by the piezo-magnetic transducer 8, illustrated in FIG. 2 in an equivalent diagram. It is evident from this figure that the piezo-magnetic transducer 8 consists of the series connection of an inductor 17 and a parallel LC circuit 19, shunted by a resistor 18, of which circuit the tuning frequency determines the natural frequency of the piezo-magnetic transducer 8. The resistor 18 represents the load of the piezo-magnetic transducer 8.

Figure 3:
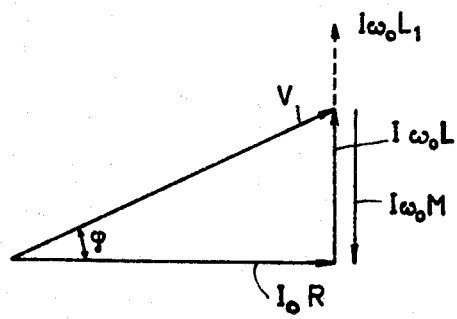
FIG. 3 shows a vector diagram for a further explanation of the device shown in FIG. 1.

The foregoing will now be explained with reference to FIG. 3 which shows the current-voltage diagram of the piezo-magnetic transducer 8 supplied by an energizing current I, of which the frequency $\omega_0$ is accurately equal to the natural frequency of the piezo-magnetic transducer 8.

Figure 2:
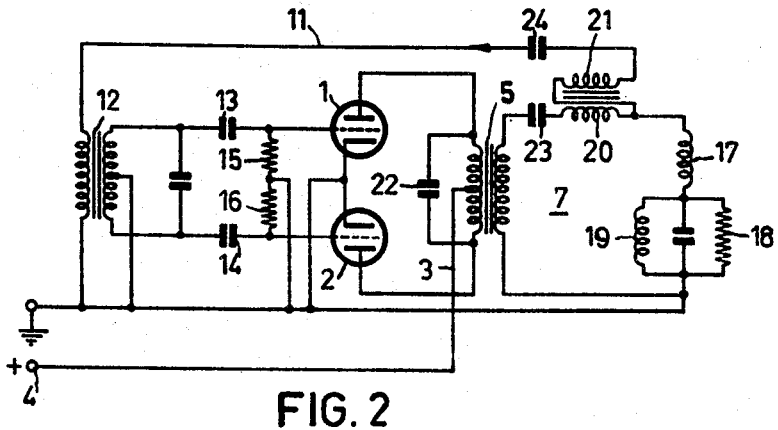
FIG. 2 shows the device of FIG. 1, the piezo-magnetic transducer being illustrated in an electric equivalent diagram to explain the operation.

If in the electrical equivalent diagram of FIG. 2 the impedance of the parallel resonant damped circuit 18, 19, and the series inductor 17 of the piezo-magnetic transducer 8, are designated by R and L respectively, a voltage of the value IR will occur at the frequency $\omega_0$ across the damped circuit 18, 19 in phase with the energizing current I. At the same time a voltage appears across the series inductor 17 of the value $I\omega_0 L$, having a 90° phase shift. The vectorial sum then represents the total voltage V across the piezo-magnetic transducer 8. At the natural frequency $\omega_0$ of the piezo-magnetic transducer a phase shift is produced between current and voltage, the value of this shift increasing with an increasing load.

If the piezo-magnetic transducer 8 is included as a frequency-determining element in the load circuit of the oscillator 1, 2, the latter will not accurately oscillate at the natural frequency $\omega_0$ of the piezo-magnetic transducer 8.

Instead, it will exhibit a frequency deviation from this natural frequency $\omega_0$ determined by the phase angle $\phi$, since in order to fulfil the oscillating condition the oscillator 1, 2 will adjust itself to such a frequency $\omega$ that the piezo-magnetic transducer, consisting of the series inductor 17 and the damped circuit 18, 19, has a resistive character at the said frequency. Thus the piezo-magnetic transducer 8 is not accurately excited in its natural frequency $\omega_0$ by the energizing current from the oscillator 1, 2. This is the reason why the conversion of electrical energy into mechanical oscillatory energy is particularly unfavourable when the piezo-magnetic transducer 8 is loaded.

In order to improve this conversion the feedback circuit 11 of the device described includes a coil 21, which is inductively coupled with a coil 20 connected in series with the piezo-magnetic transducer 8, to produce a second feedback voltage which substantially compensates for the inductive component of the feedback voltage due to the series-connected inductor 17 in the first feedback voltage. If, for example, the inductance of the coil 20 in the load circuit is designated by $L_1$, a voltage $I\omega_0 L_1$ occurs across this coil (cf. FIG. 3). By a proper choice of the mutual coupling between coils 20 and 21, a voltage opposite the voltage across the series inductor 17 of the piezo-magnetic transducer 8 of a value $I\omega_0 M$ occurs across the coil 21 in the feedback circuit 11, the winding 21 being wound in the proper sense relative to winding 20 in order to produce the illustrated 180° phase shift in voltage, $I\omega_0 M$, as shown in the figure. M designates the mutual inductance between the coil 20 in the load circuit 7 and the coil 21 in the feedback circuit 11. If the mutual inductance M between the coils 20 and 21 is rendered equal to the series inductor 17 of the piezo-magnetic transducer 8, the inductive component in the feedback voltage produced by the series inductor 17 of the piezo-magnetic transducer 8 is accurately compensated, so that the damped oscillatory circuit 18, 19 constitutes the sole frequency-determining element of the oscillator 1, 2. Hence the oscillator 1, 2 will oscillate accurately at the natural frequency $\omega_0$ of the piezo-magnetic transducer 8, if provisions are made that the energizing current produced by the feed-back oscillator is fed to the piezo-magnetic transducer 8, while a frequency dependent current division is avoided. It is particularly to be avoided to shunt the piezo-magnetic transducer 8 by a capacitor or a different frequency-dependent impedance.

In the device described above, the measures set out, which ensure an excitation of the piezo-magnetic transducer 8 accurately in its natural frequency irrespective of the operational conditions, are of essential importance to an advantageous efficiency in the conversion of electrical energy into mechanical oscillatory energy, but otherwise these measures adversely effect the purpose aimed at. These measures prevent, in particular, the realisation of a correct load adaption or impedance match between the oscillator tubes 1, 2 and the piezo-magnetic transducer 8, since as is illustrated in FIG. 3, the tube load constituted by the piezo-magnetic transducer 8 is, at its natural frequency, of a predominantly inductive nature, which is even enhanced by the addition of the series-connected coil 20 in the load circuit 7.

While maintaining the advantages obtained, this load adaptation and hence a maximum transfer of energy from the oscillator tubes 1, 2 to the piezo-magnetic transducer 8 is obtained in a simple manner by including a series capacitor 23 in the load circuit 7 of the device described, which capacitor is tuned with the series inductors in the load circuit 7 approximately to the natural frequency $\omega_0$ of the piezo-magnetic transducer 8. The load of the oscillator 1, 2 is constituted solely by the damped circuit 18, 19 in the equivalent diagram of the piezo-magnetic transducer 8, which is a real impedance at its natural frequency $\omega_0$, so that by a suitable proportioning of the transformer 5 a load adaptation may be obtained.

By carrying out the measures described, a device for producing supersonic oscillations is obtained which is distinguished not only by a simple structure, but also by a maximum efficiency.

For a further improvement of the device described the matching transformer 5 is tuned by means of a parallel capacitor 22 approximately to the natural frequency of the piezo-magnetic transducer 8. This tuned transformer 5, 22, together with the tuned series circuits 5, 17, 23 in the load circuit, has, at the natural frequency of the piezo-magnetic transducer 8, the pass characteristic curve of a bandpass filter having a bandwidth of, for example, 2 kc./s. For frequencies lying beyond the bandwidth of the bandpass filter the input circuit formed by the tuned transformer 5, 22 in the bandpass filter thus formed has a very low impedance, so that with these latter oscillations no high voltages can occur at the anodes of the tubes 1, 2, which voltages would otherwise produce an increase in tube dissipation. This measure is particularly advantageous for class C-connected oscillator tubes, of which the pulsatory tube currents contain strong harmonic components.

The feedback circuit 11 also has the pass characteristic curve of a bandpass filter, which is achieved in this case by tuning the series-connected inductors 17, 21 with the aid of a series capacitor 24 and the secondary winding of the feedback transformer 12, by means of a parallel capacitor 25, approximately to the natural frequency of the piezo-magnetic transducer 8. The penetration of undesired frequencies into the feedback circuit is then avoided and moreover phase shifts of the feedback voltage across the feedback circuit as such, for example, due to grid currents in the oscillator valves 1, 2, are minimized.

A practical elaborately tested device of the kind set forth had the following data:

Tubes: 2 x TB2, 5/400.
Coil 17: 139 $\mu$h.
Coil 20: 7 $\mu$h.
Coil 21: 2780 $\mu$h.
Capacitor 22: 900 $\mu\mu$f.
Capacitor 23: 0.16 $\mu$f.
Capacitor 24: 0.018 $\mu$f.
Capacitor 25: 0.008 $\mu$f.
Mutual inductors 20, 21: 139 $\mu$h.
Transformation ratio of transformer 5: 1:10
Transformation ratio of transformer 12: 3.5:1

The device described not only has the advantages set forth, i.e. a simple structure, a maximum efficiency in conversion, an advantageous tube load, but also a simple control, since no frequency readjustment is required, while, in addition, the important advantage for practical purposes of a great reliability is obtained. As stated above, the oscillator load is constituted solely by the parallel circuit 18, 19 in the electrical equivalent diagram of the piezo-magnetic transducer 8, so that across the parallel circuit 18, 19 a voltage occurs which is proportional to the output voltage of the oscillator 1, 2. This voltage, in its amplitude between no-load and full load, is substantially equal to the supply voltage of the oscillator tubes 1, 2, or in other terms, the mechanical oscillatory amplitude of the piezo-magnetic transducer 8, which is proportional to the voltage across the parallel circuit 18, 19, is substantially constant between no-load and full load. The piezo-magnetic transducer 8 may therefore be exposed to greatly varying operating conditions without the risk of a defect of this transducer owing to excessive mechanical oscillation amplitude.

It should be noted that instead of connecting the feedback circuit 11 between the coil 20 and the piezo-magnetic transducer 8, the feedback circuit 11 may, as an alternative, be connected to the end of the coil 20 remote from the transducer 8. In this case the mutual inductance M between the coils 20 and 21 is to be rendered approximately equal to the sum of the inductance 17 and the inductance of the coil 20.

Figure 4:
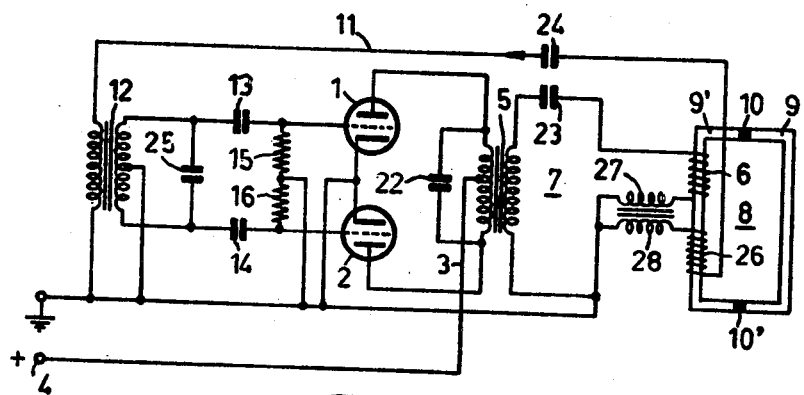
FIGS. 4 and 5 show further embodiments of the device according to the invention and FIG. 6 shows a vector diagram to explain the device illustrated in FIG. 5.

FIG. 4 shows a modified arrangement of the device of FIG. 1. Corresponding elements are designated by the same reference numerals.

The device shown in FIG. 4 differs from that shown in FIG. 1 in that the feedback circuit 11 is connected by means of a transformer to the load circuit 7. This is achieved by providing the magnetostrictive transducer 8 with a coupling coil 26, which is inductively coupled with the energizing coil 6. As described with reference to FIG. 1, in order to produce the second feedback voltage, this device is provided with a coil 27 in series with the energizing coil 6. Coil 27 is inductively coupled with a coil 28 included in the feedback circuit 11.

The operation is completely identical to that of the device of FIG. 1. Only the transformation ratio between the coils 6, 26 of the piezo-magnetic transducer 8 is to be taken into account. With a transformation ratio between the coils 6 and 26 of one, the mutual inductance M between the coils 27 and 28 is to be equalized to the series inductor 17 (cf. FIG. 2) of the magnetic transducer 8 in the manner described with reference to FIG. 1. With a different transformation ratio the mutual inductance M between the coils 27 and 28 is to be modified to the same transformation ratio. If, for example, the transformation ratio is 1:2, the mutual inductance between the coils 27 and 28 is to be rendered equal to ½ of the series inductor 17 of the transducer 8.

Figure 5:
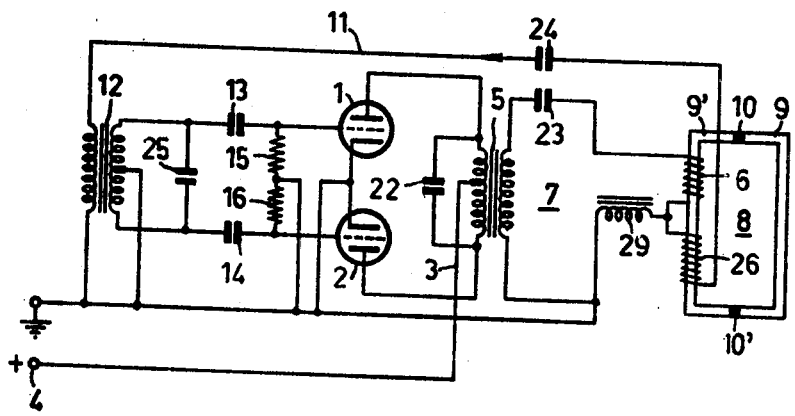

FIG. 5 shows a further embodiment of the device shown in FIG. 4. Use is made of the transformer connection of the feedback circuit 11 to obtain a simplification. The coil 27 in the load circuit 7 (cf. FIG. 4) and the coil 28 in the feedback circuit 11 are replaced by a common coil 29, which is included both in the load circuit 7 and in the feedback circuit 11. In the device shown this common coil 29 is connected in series with the energizing coil 6 and with the coupling coil 26 of the piezo-magnetic transducer 8.

Figure 6:
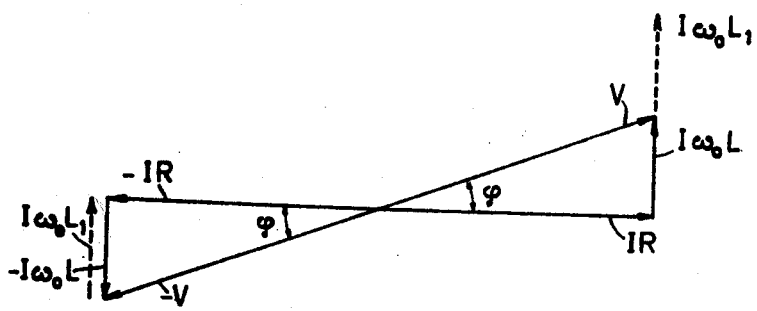

The operation of this device will be explained by reference to the vector diagram of FIG. 6.

In the manner described with reference to FIG. 1, the energizing coil 6 has produced across it, at the natural frequency of the magnetic transducer 8, a voltage V. This voltage is composed of the voltage drop IR across the oscillatory system 18, 19 formed by the damped circuit in the piezo-magnetic transducer 8, this voltage occurring in co-phase with the energizing current I, and of a voltage at right angles thereto across the series inductor 17, this voltage having a value of $I\omega_0 L$. Across the coil 29 there is produced a voltage $I\omega_0 L_1$, represented by the broken line, wherein $L_1$ designates the inductance of the coil 29. In the embodiment shown the inductance of the coil 29 of the value $L_1$ is rendered substantially equal to the series inductance 17 of the piezo-magnetic transducer 8.

In the embodiment shown the transformation ratio between the energizing coil 6 and the coupling coil 26 is approximately equal to one. In this case, with the winding sense of the coupling coil 26 as shown, a voltage occurs across the coil 26 which has the same value but the opposite phase of the voltage V across the energizing coil 6, so that it may be represented by a vector $-V$. This figure also illustrates the components of this voltage $-V$, i.e. $-IR$ and $-I\omega_0 L$ respectively.

The combination of the voltage $-V$ across the coupling coil 26 and the voltage $I\omega_0 L_1$ across the common coil 29 yields the total feedback voltage. Therefore, as illustrated in the figure, the interfering component in the feedback voltage due to the series inductor 17 of the magnetic transducer 8 is accurately compensated. As stated above, the oscillator frequency will accurately follow the natural frequency of the piezo-magnetic transducer 8, so that the advantages of the device described above are obtained.

As in the device shown in FIG. 4, the transformation ratio between the coils 6 and 26 of this device is also to be taken into account in proportioning the common coil 29. If, for example, the transformation ratio is 1:2, the value of the common coil 29 is to be equal to half the value involved in a transformation ratio of one.

It should finally be noted that in the device shown, a plurality of parallel-connected piezo-magnetic transducers may also be employed. In a practical embodiment of the device shown in FIG. 1, six transducers were connected in parallel. It has been found to be advantageous in this case to include a series-connected tuning capacitor in each of the associated parallel-connected branches.

What is claimed is:

1. Apparatus for producing oscillations comprising an amplifying device including an input circuit and an output circuit, a load circuit comprising a magnetostrictive transducer including means for coupling said transducer to said output circuit, said transducer exhibiting a reactive impedance at a predetermined oscillation frequency, means for deriving a first feedback voltage from said transducer having a reactive component, a feedback circuit connected between said load circuit and the input circuit of said amplifying device and coupling said first feedback voltage derived from said transducer to the input of said amplifying device, and means coupled to said output circuit for coupling to said input circuit a second feedback voltage of said predetermined frequency and having a reactive component which substantially compensates the reactive component of said first feedback voltage applied to said input circuit by means of said feedback circuit.

2. Apparatus for producing oscillations comprising an amplifying device including an input circuit and an output circut, a load circuit comprising a piezo-magnetic transducer including means for coupling said transducer to said output circuit, said transducer having a predetermined natural frequency of oscillation and said load circuit having an inductive impedance component at said natural frequency, means for deriving a first feedback voltage having an inductive component from said transducer, a feedback circuit connected between said load circuit and the input circuit of said amplifying device and coupling said first feedback voltage to the input of said amplifying device, means for deriving a second feedback voltage from said load circuit of said predetermined frequency having an inductive component which substantially compensates the inductive component of said first feedback voltage, and means for coupling said second feedback voltage into said feedback circuit, said feedback circuit comprising means for combining said second feedback voltage with said first feedback voltage in a sense to substantially cancel said inductive component of said first feedback voltage.

3. Apparatus for producing oscillations of predetermined frequency comprising an amplifying device including an input circuit and an output circuit, a load circuit including a piezo-magnetic transducer connected across said output circuit and adapted to produce mechanical energy, said transducer under load conditions exhibiting a net inductive impedance at said predetermined frequency, means for deriving from said transducer a first feedback voltage having an inductive component having a magnitude as determined by the mechanical energy produced by said transducer, means for applying said feedback voltage to the input circuit of said amplifying device, means for deriving from said load circuit a second feedback voltage of said predetermined frequency having an inductive component having a magnitude as determined by the electrical energy supplied to said transducer, means for combining said first and second feedback voltages in a sense compensating the said inductive voltage component of said first feedback voltage, said load circuit further comprising an inductive reactance component and capacitor means serially connected in said load circuit compensating for the reactance of said inductor thereby to provide a series resonant circuit tuned to said predetermined frequency.

4. Apparatus for producing supersonic oscillations comprising an amplifying device including an input circuit and an output circuit, a frequency determining load circuit including a piezo-magnetic transducer connected to said output circuit, said transducer having a predetermined natural frequency of oscillation and having an inductive impedance component at said natural frequency, said load circuit further comprising serially connected capacitor and inductance means connected in series with said transducer, said capacitor forming a series resonant circuit with the load circuit inductance which is tuned to the natural frequency of said transducer, means for deriving a first feedback voltage having an inductive component from said transducer, a feedback circuit connecting said load circuit to the input circuit of the amplifying device and coupling said first feedback voltage to the input of said amplifying device, said feedback circuit including a series inductance inductively coupled to said load circuit inductance for deriving in said feedback circuit inductance a second feedback voltage of said predetermined natural frequency having an inductive component which substantially compensates for the inductive component of said first feedback voltage, said first and second feedback voltages acting to sustain oscillations in said apparatus substantially at the natural frequency of said transducer for varying load conditions.

5. Apparatus as described in claim 4, wherein said feedback circuit further comprises a feedback transformer connected to the input circuit of said amplifying device and a capacitor connected in series with said feedback circuit series inductance, said capacitor forming a resonant circuit with said feedback inductance tuned to the natural frequency of said transducer, said feedback transformer including a parallel connected capacitor tuning said transformer to said predetermined natural frequency, the combination of said tuned feedback circuit and said tuned feedback transformer forming a bandpass filter whose pass band is substantially centered about the natural frequency of said transducer.

6. Apparatus for generating oscillations comprising an amplifying device including an input circuit and an output circuit, a load circuit including a frequency determining piezo-magnetic transducer having a predetermined natural frequency of oscillation and having an inductive impedance component at said natural frequency, said output circuit including a matching transformer coupling said amplifying device to said load circuit, a first capacitor connected across the primary winding of said transformer thereby tuning said transformer substantially to the natural frequency of said transducer, said load circuit further comprising a second capacitor serially connected with the load circuit inductance and forming therewith a series resonant circuit tuned to the natural frequency of said transducer, the combination of said tuned matching transformer and said tuned load circuit forming a bandpass filter whose pass-band is substantially centered about the natural frequency of said transducer, means for deriving a first feedback voltage having an inductive component from said transducer, a feedback circuit connected between said load circuit and the input circuit of said amplifying device coupling said first feedback voltage to the input of said amplifying device, means for deriving a second feedback voltage of said predetermined frequency having an inductive component which substantially compensates for the inductive component of said first feedback voltage, and means for coupling said second feedback voltage into said feedback circuit whereby oscillations are sustained in said apparatus substantially at the natural frequency of said transducer for varying load conditions.

7. Apparatus for generating oscillations comprising an amplifying device including an input circuit and an output circuit, a load circuit connected across said output circuit and comprising a first coil serially connected with a piezo-magnetic transducer, said transducer having a predetermined natural frequency of oscillation and having an inductive impedance component at said natural frequency, means for deriving a first feedback voltage having an inductive component from said transducer, a feedback circuit directly connected between said load circuit and the input circuit of the amplifying device and coupling said first feedback voltage to the input of said amplifying device, said feedback circuit including a second serially connected coil inductively coupled with said first coil included in said load circuit for deriving therein a second feedback voltage of said predetermined natural frequency having an inductive component, the mutual inductance of said inductively coupled coils being approximately equal to the inductance in said load circuit, said second feedback voltage thereby substantially compensating for the inductive component of said first feedback voltage, said first and second feedback voltages combining in a sense to sustain oscillations in said apparatus substantially at the natural frequency of said transducer.

8. Apparatus for generating oscillations comprising an amplifying device including an input circuit and an output circuit, a load circuit connected across said output circuit and comprising a first coil serially connected with a piezo-magnetic transducer, said transducer having a predetermined natural frequency of oscillation and having an inductive impedance component at said natural frequency, means for deriving a first feedback voltage having an inductive component from said transducer, a feedback circuit inductively coupled with said load circuit by means of a transformer and coupling said first feedback voltage to the input circuit of the amplifying device, said feedback circuit including a second serially connected coil inductively coupled with said first coil included in said load circuit for deriving therein a second feedback voltage of said predetermined natural frequency having an inductive component, the mutual inductance of said inductively coupled coils being approximately equal to the product of the load circuit inductance causing said inductive component of said first feedback voltage which is to be compensated and the transformation ratio of said transformer inductively coupling said load circuit to said feedback circuit, said second feedback voltage thereby substantially compensating for the inductive component of said first feedback voltage, said first and second feedback voltages combining in a sense to sustain oscillations in said apparatus substantially at the natural frequency of said transducer.

9. Apparatus for generating oscillations comprising an amplifying device including an input circuit and an output circuit, a load circuit connected across said output circuit and comprising an inductance serially connected wtih a piezo-magnetic transducer, said transducer having a predetermined natural frequency of oscillation and having an inductive impedance component at said natural frequency, means for deriving a first feedback voltage having an inductive component from said transducer, a feedback circuit inductively coupled with said load circuit by means of a transformer and coupling said first feedback voltage to the input circuit of the amplifying device, said inductance also being connected in said feedback circuit and having a value approximately equal to the load circuit inductance producing the inductive component of the first feedback voltage to be compensated multiplied by the transformation ratio of said transformer inductively coupling said load circuit to said feedback circuit, said second feedback voltage thereby substantially compensating for the inductive component of said first feedback voltage, said first and second feedback voltages combining in a sense to sustain oscillations in said apparatus substantially at the natural frequency of said transducer.

10. Apparatus for producing oscillations comprising an amplifying device including an input circuit and an output circuit, a load circuit comprising a plurality of parallel connected piezo-magnetic transducers and a plurality of capacitors each individually serially connected with a transducer, each of said transducers having a predetermined natural frequency of oscillation and said load circuit having an inductive impedance component at said natural frequency, each of said capacitors forming a resonant circuit with its associated transducer tuned to the natural frequency of said transducer, means for deriving a first feedback voltage having an inductive component from said transducers, a feedback circuit connected between said load circuit and the input circuit of said amplifying device and coupling said first feedback voltage to the input of said amplifying device, means for deriving a second feedback voltage from said load circuit of said predetermined frequency having an inductive component which substantially compensates the inductive component of said first feedback voltage, and means for coupling said second feedback voltage into said feedback circuit.

11. Apparatus for producing oscillations of a given frequency comprising an amplifying device having an input circuit and an output circuit, a load circuit comprising a magnetostrictive transducer including means for coupling said transducer to said output circuit, said load circuit having a reactive impedance component at said given frequency, means for deriving a first feedback signal from said transducer having a reactive component which is determined by said reactive impedance component of the load circuit, means for deriving a second feedback signal from said output circuit having a reactive component which substantially compensates the reactive component of said first feedback signal, and means for combining said first and second feedback signals and applying said combined signals to said input circuit thereby to sustain oscillations of said given frequency.

12. Apparatus for producing oscillations of a given frequency comprising an amplifying device having an input circuit and an output circuit, a load circuit comprising a magnetostrictive transducer having a mechanical resonant frequency of said given frequency and including means for coupling said transducer to said output circuit, said load circuit having an inductive impedance component at said given frequency, means for deriving a first feedback signal of said given frequency from said load circuit and having an inductive component, means for deriving from said load circuit a second feedback signal of said given frequency having an inductive component which substantially compensates the inductive component of said first feedback signal, and a feedback circuit coupling said load circuit to said input circuit and comprising means for combining said second feedback signal with said first feedback signal in a sense cancelling the said inductive component of said first feedback signal.

13. Apparatus as described in claim 12 wherein said transducer comprises a core of magnetostrictive material on which a driver coil is mounted and wherein said means for deriving said second feedback signal comprises a first inductance element serially connected with said driver coil and a second inductance element inductively coupled to said first inductance element.

14. Apparatus as described in claim 13 wherein said second inductance element is included in said feedback circuit, said feedback circuit further comprising a capacitor in series with said second inductance element to form therewith a series resonant circuit tuned approximately to the resonant frequency of said transducer, and said load circuit further comprises a second capacitor connected in series with said first inductance element and said driver coil to form therewith a series resonant circuit tuned substantially to the resonant frequency of said transducer.

References Cited in the file of this patent

UNITED STATES PATENTS

| | | |
|---|---|---|
| 1,811,128 | Harrison | June 23, 1931 |
| 2,101,272 | Scott | Dec. 7, 1937 |
| 2,759,102 | Burns | Aug. 14, 1956 |
| 2,787,710 | Van Tol | Apr. 2, 1957 |
| 2,798,953 | Fisher | July 9, 1957 |
| 2,889,473 | Ingham | June 12, 1959 |

UNITED STATES PATENT OFFICE
CERTIFICATE OF CORRECTION

Patent No. 3,177,416 April 6, 1965

Hermanus Stephanus Josephus Pijls et al.

It is hereby certified that error appears in the above numbered patent requiring correction and that the said Letters Patent should read as corrected below.

Column 2, line 42, after "lent" insert -- electric --.

Signed and sealed this 18th day of January 1966.

(SEAL)
Attest:

ERNEST W. SWIDER
Attesting Officer

EDWARD J. BRENNER
Commissioner of Patents